(12) United States Patent
Spry

(10) Patent No.: US 6,739,827 B1
(45) Date of Patent: May 25, 2004

(54) METHOD AND APPARATUS FOR EFFECTING MOVEMENT OF AN ARTICLE BY EMPLOYING FLOWABLE PARTICULATE MATTER

(76) Inventor: William J. Spry, 356 Windgate Pl., Youngstown, NY (US) 14174

( * ) Notice: Subject to any disclaimer, the term of this patent is extended or adjusted under 35 U.S.C. 154(b) by 157 days.

(21) Appl. No.: 10/178,867

(22) Filed: Jun. 24, 2002

Related U.S. Application Data

(60) Provisional application No. 60/301,717, filed on Jun. 28, 2001.

(51) Int. Cl.[7] ................................................. B65G 1/00
(52) U.S. Cl. ....................................... 414/800; 198/580
(58) Field of Search ................................. 414/800–816, 414/328; 198/580, 465.1; 405/15, 31, 272, 282, 303

(56) References Cited

U.S. PATENT DOCUMENTS 3,477,594 A * 11/1969 Cicco ........................ 414/328
4,200,422 A * 4/1980 Stodt .......................... 414/304
4,537,554 A * 8/1985 Collins, Jr. .................. 414/328

OTHER PUBLICATIONS

DAS, "Advanced Soil Mechanics" Second Edition, pp. 380–391, California State University.

Rankine, "On the Stability of Loose Earth", Philosophical Transactions of the Royal Society of London (1856), pp. 9–27, vol. 147, London.

* cited by examiner

Primary Examiner—Richard Ridley
(74) Attorney, Agent, or Firm—Arnold B. Silverman; Eckert Seamans Cherin & Mellott, LLC

(57) ABSTRACT

A method and apparatus for using a resultant field of force such as gravity operating on a constrained agglomeration of a flowable granular material, produces a useful force which can serve to move an article along a predetermined path. The process and apparatus may involve elevating the article, moving it along a horizontal path or lowering the article.

38 Claims, 12 Drawing Sheets

US 6,739,827 B1

METHOD AND APPARATUS FOR EFFECTING MOVEMENT OF AN ARTICLE BY EMPLOYING FLOWABLE PARTICULATE MATTER

CROSS REFERENCE TO RELATED APPLICATION

This application claims the benefit of U.S. Provisional application Serial No. 60/301,717, filed Jun. 28, 2001.

BACKGROUND OF THE INVENTION

1. Field of the Invention

The present invention relates generally to methods and apparatus for employing a flowable granular material, along with its natural angle of repose in a field of force, such as gravity, as a basis for establishing other forces which may be put to a useful purpose such as in moving an article.

2. Description of the Prior Art

In Ancient Egypt the ruling dynasties erected giant structures, such as stone obelisks and pyramids, to honor themselves and their deities. It is well known that the technologies to erect these structures have been lost, and many theories have been proposed in modern times to account for these engineering feats. The "sand engine" of the present invention could have been employed to raise or orient the giant obelisks, but there is no evidence that such technology was actually known or used.

SUMMARY OF THE INVENTION

The present invention relates to the discovery of the technology that is useful in many ways and could have been employed to move and raise giant stone obelisks, as well as other articles.

The present invention provides a method and related apparatus for utilizing the force of gravity operating on a partially constrained agglomeration of flowable particulate material to produce a useful power output, which can be enhanced or reduced in order to effect desired movement of an article. Depending upon the physical orientation of the article, such movement may be purely translational, purely rotational or a combination of translational and rotational movement.

By providing the flowable particulate material in the desired quantity and position, efficient movement of a wide variety of articles either along a level path or an upwardly inclined path or a downwardly inclined or vertical path may be provided.

A wide variety of applications are contemplated.

It is an object of the present invention to provide an effective method and associated apparatus for employing a quantity of flowable particulate material to provide a force of a predetermined desired direction and magnitude in order to effect movement of an article in a desired path.

It is another object of the present invention to provide such a system which will enable those skilled in the art to custom design the application of the method and apparatus to a particular need.

It is an object of this invention to provide an engine that utilizes the force of gravity operating on a constrained agglomeration of flowable granular material to produce a directed useful power output.

It is another object of this invention to provide power output that can be executed with magnified or reduced force or torque in comparison to the characteristics of the power input.

It is a further object of the present invention to employ the method and apparatus of the present invention to a wide variety of applications, including, for example, children's toys, educational devices, amusement devices, engineering applications and commercial and industrial applications.

It is a further object of the present invention to provide such methods and systems which will be economical to employ.

These and other objects of the invention will be fully understood from the following description of the invention with reference to the drawings appended hereto.

DESCRIPTION OF THE PREFERRED EMBODIMENTS

As employed herein, the term "article" means a three-dimensional object, which is to be moved by the method or apparatus of the present invention on a level path, an upward incline, a downward incline, a generally vertical path or combinations thereof.

As employed herein, the term "flowable granular material" or "flowable particulate material" means a plurality of solid particles which, under the influence of gravity and other forces, will be subject to relative movement with respect to other such particles and shall expressly include but not be limited to sand, rock particles, synthetic particles and combinations thereof. The particles or granules may be considered to have "semi-hydraulic" properties.

As employed herein, the terms "angle of repose" or "drained friction angle" shall refer to the angle that the upper surface of a pile of flowable granular material or flowable particulate material, such as sand, forms with respect to the horizontal naturally when piled on a flat surface. The angle defines the magnitude of the horizontal force that the sand, for example, exerts when piled against a generally vertical surface such angles of repose are preferably about 20 to 46 degrees.

Among the concepts involved in the method and apparatus of the present invention are: (1) dimensions of sand that provides the engine capability to move different masses; (2) surface angles of sand that provide the engine to move different masses; (3) the angles of movement, and mass of sand required, for different masses; (4) the use of retaining walls, rails, and sleds to move different masses; and (5) the uses of towers, tracks and valves to place different masses.

This invention is an engine that utilizes the force of gravity operating on a partially constrained agglomeration of flowable granular material, such as sand to produce a directed useful power output. The power output can be executed with magnified or reduced force or torque in comparison to the characteristics of the power input.

Figure 1:
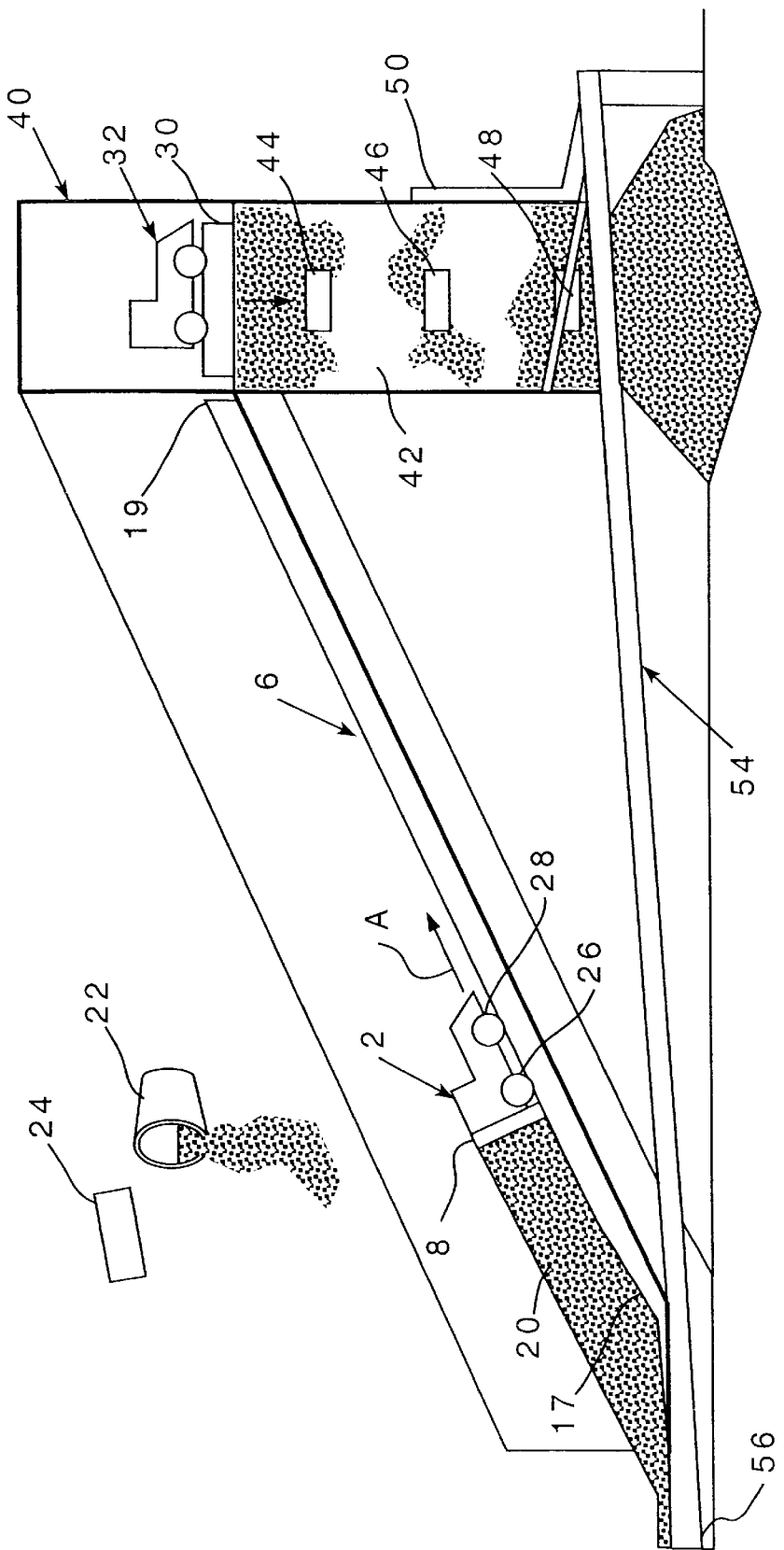
FIG. 1 is a schematic drawing illustrating one embodiment of the invention wherein a vehicle is elevated to a higher level and subsequently moved to a lower level.

One implementation of this engine is shown in the example of FIG. 1. In this representative example of the invention, sand 20 is piled against the generally vertical surface of a large wall 8 that is supported by track 6. This may be a 2% grade but has been exaggerated for clarity of illustration.

Figure 2:
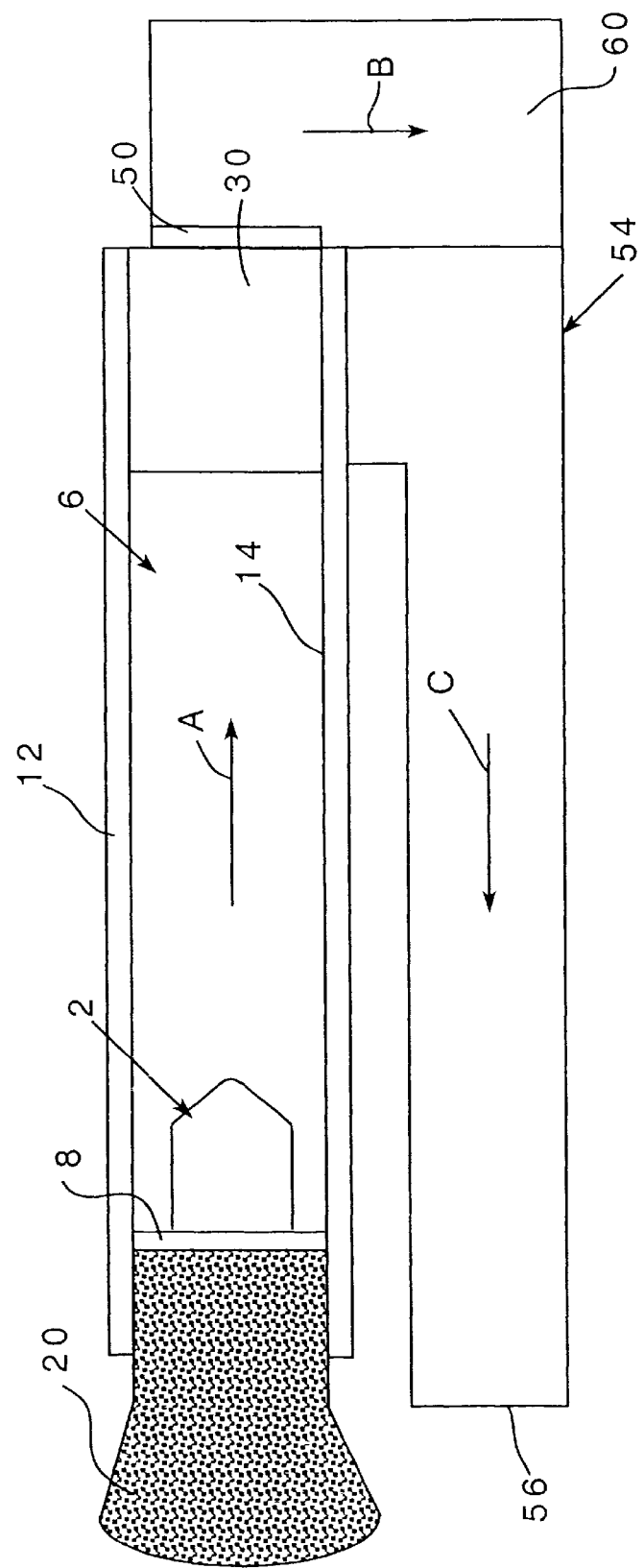
FIG. 2 is a top plan view of the schematic of FIG. 1.

The surface of the sand, on the left in FIG. 2, is unconstrained and follows a normal angle of repose (or drained friction angle). This is the angle such a pile of sand forms naturally when piled on a flat surface under the influence of the earth's gravity. In this situation, all the internal forces between the various particles of this aggregate are in equilibrium with the gravitational forces acting on them.

On the right, however, the sand is constrained by the generally vertical surface of the wall 8. The horizontal constraint of the sand particles (by the generally vertical surface), while they are under the influence of gravity, produces a horizontal force by the sand particles against the constraining surface of the wall. This force can be calculated directly. This force is in a direction other than the direction of the force of gravity. It depends (1) on the density of sand multiplied by the acceleration of gravity; and (2) the natural angle of repose Ø of the sand. (See Rankine, J. B. (1857), "On the Stability of Loose Earth," Philosophical Transactions of the Royal Society of London, Vol. 147, Part 1, pp. 9–27; "Advanced Soil Mechanics," Second Edition, Braja M. Das, California State University, Sacramento.)

The active horizontal force developed by sand which is piled to a height H against a vertical surface of constant width W (in this example) is:

$$F = D_S * sigma_h * W *_0 \int^H x\, dx \text{ or } F = D_S * sigma_h * W * H^2 / 2$$

Wherein

F=Force in pounds $D_S$=Sand density in pounds per cubic foot $Sigma_h$=Rankine coefficient for the AR/DFA (i.e., angle Ø, the angle of repose or drained friction angle) of the sand used W=Width in feet H=Height in feet x=variable of integration dx=differential Considering an example, wherein the "unfinished Aswan Obelisk" has:

$D_s$=100 pounds per cubic foot

H=13.8 feet

With Ø=28 degrees, then $sigma_h = sigma_V * (tan^2(45-Ø/2)) = 0.36$

Then F=100*0.36*(13.8)²*½*cos(arctan %S)=47,431 lb.

In the example, the article is assumed to be pushed up a 2% slope. Thus, the need for the multiplicative term cos (arctan %S).

The advantage of this engine is that the large direct force can be produced and maintained by piling sand against the vertical constraining wall using, for example, only one human placing no more than perhaps 20 pounds of sand at a time on top of the constrained sand pile.

As shown schematically in FIGS. 1 and 2, an article 2, which in the form shown is a vehicle, is structured to be moved along a first track 6 in the direction of arrow A in a manner to be described hereinafter. The vehicle 2 or other article could be supported on a sled or pallet, if desired, and move with the sled or pallet. A movable rear wall 8 is disposed rearwardly of the article 2 and is preferably movably secured to at least one of the track 6 or the generally parallel sidewalls 12, 14 to permit sliding movement between the rear wall 8 and the track 6 and sidewalls 12, 14. The article 2 is elevated along track 6 under the influence of the flowable particulate material 20, which is accumulated behind and in contact with rear wall 8. In a manner to be described hereinafter, the flowable particulate material 20 may be delivered manually as by bucket 22 or by means of a conveyor such as that conveyor 24, as shown schematically. In the form shown, the track 6 is sloped upwardly from the rear portion 17 toward the front portion 19. It may, for example, have an angle with respect to the horizontal of about 2 to 10 degrees, although a larger angle is shown in FIG. 1 for clarity of illustration. Also, as the article is a vehicle having wheels, such as 26, 28, and a corresponding pair of wheels (not shown), the force moving the article 2 will have to overcome the rolling friction as distinguished from sliding friction if there were no wheels on the particular article. If desired, a plurality of rollers (not shown) may be provided along the track to facilitate ease of movement of an article not having wheels.

At the upper end of the track is a platform 30, which is adapted to receive the vehicle, such as vehicle 2 or 32. A column 40 contains the flowable particulate material 42 and is provided with a plurality of valves 44, 46, 48 to permit discharge of the particulate or granular material 42 therefrom to thereby lower the platform 30 and responsively lower the vehicle 2, 32 until the desired level of gate 50 is reached, whereupon the gate 50 may be moved to an open position so that the vehicle 2, 32 may move onto downwardly sloped second track 54 and be delivered to region 56. This movement is effected with the gate 50 rotated downwardly onto track portion 60 and the article 2, 32 moving therealong in the directions indicated by arrows B, C. As will be described hereinafter in greater detail, the nature of the specific flowable particulate material, the geometric angles involved, and the natural angle of repose of the material under the influence of gravity, will be considered both in terms of the force applied by the material 20 to move article 2, 32, and the discharge of the material through valves 44, 46, 48 to lower the article such as 2, 32.

A preferred form of flowable particulate or granular material is sand of various types. As will be apparent to those skilled in the art, other types of flowable particulate material, such as particulate size rock and synthetic particulate materials, as well as others, and mixtures thereof, may be employed. Among the factors to be considered in making such a decision would be the cost of the material, the physical properties of the material, the size and surface configuration of the material and the magnitude of the force to be generated.

Figure 3:
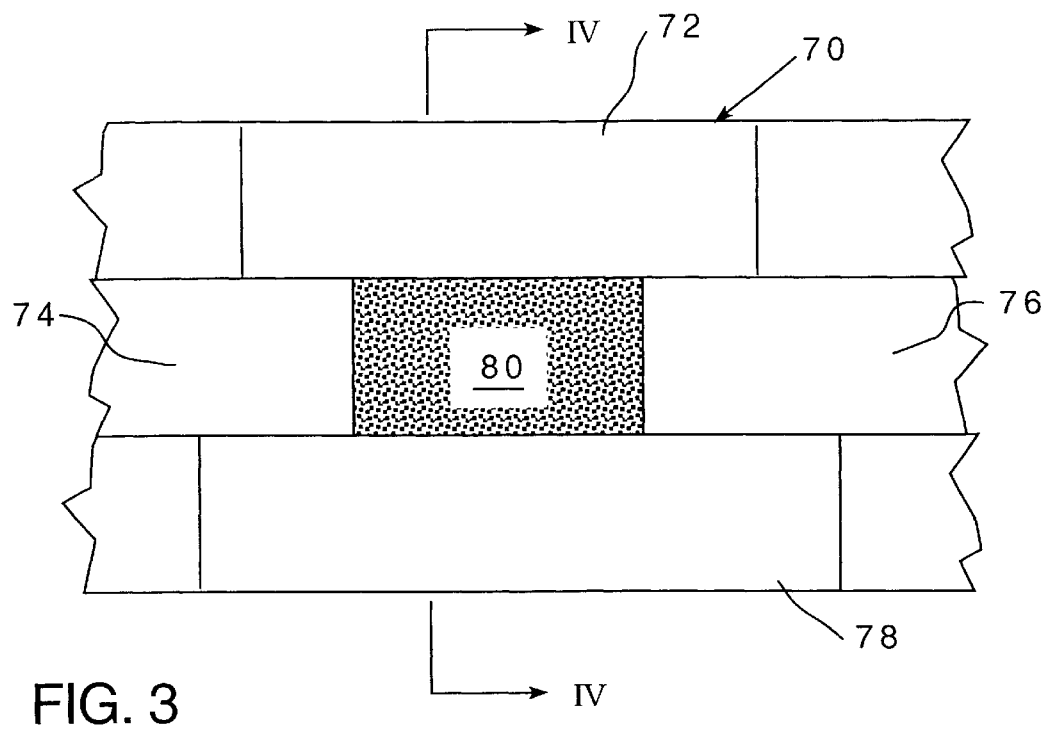
FIG. 3 is an elevational view of a form of valve permitting removal of flowable particulate material from the column shown to the right of FIG. 1.
Figure 4:
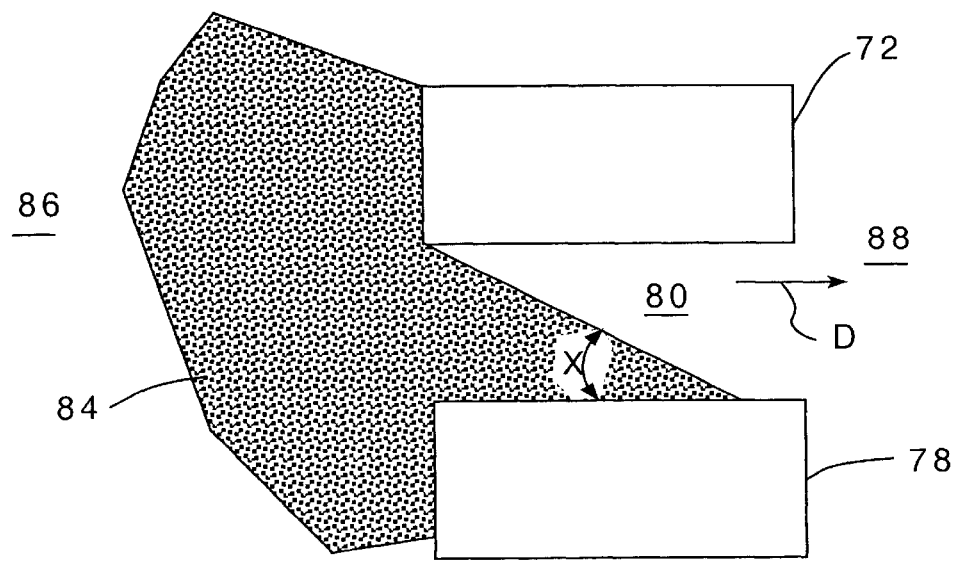
FIG. 4 is a cross-sectional illustration showing a portion of the valve of FIG. 3 taken through IV—IV.

Referring to FIGS. 3 and 4, there is shown a portion 70 of a column 40 consisting of a plurality of blocks, such as 72, 74, 76, 78 defining a fixed valve opening 80 with the flowable particulate material 84 being positioned on the inside of the column designated generally by 86, with the valve opening 80 communicating with the exterior of the column indicated generally by 88, and a gravitationally created angle x of repose of the material, serving to limit outward flow of the flowable particulate material in the direction indicated by arrow D.

It will be appreciated that the embodiment disclosed with respect to FIGS. 1–4 contemplates the use of sloped tracks, level tracks may be used in certain situations. Also, if desired, the invention may be employed solely to elevate an article, or solely to move an article to a lower elevation without using other portions of the combination.

Figure 5:
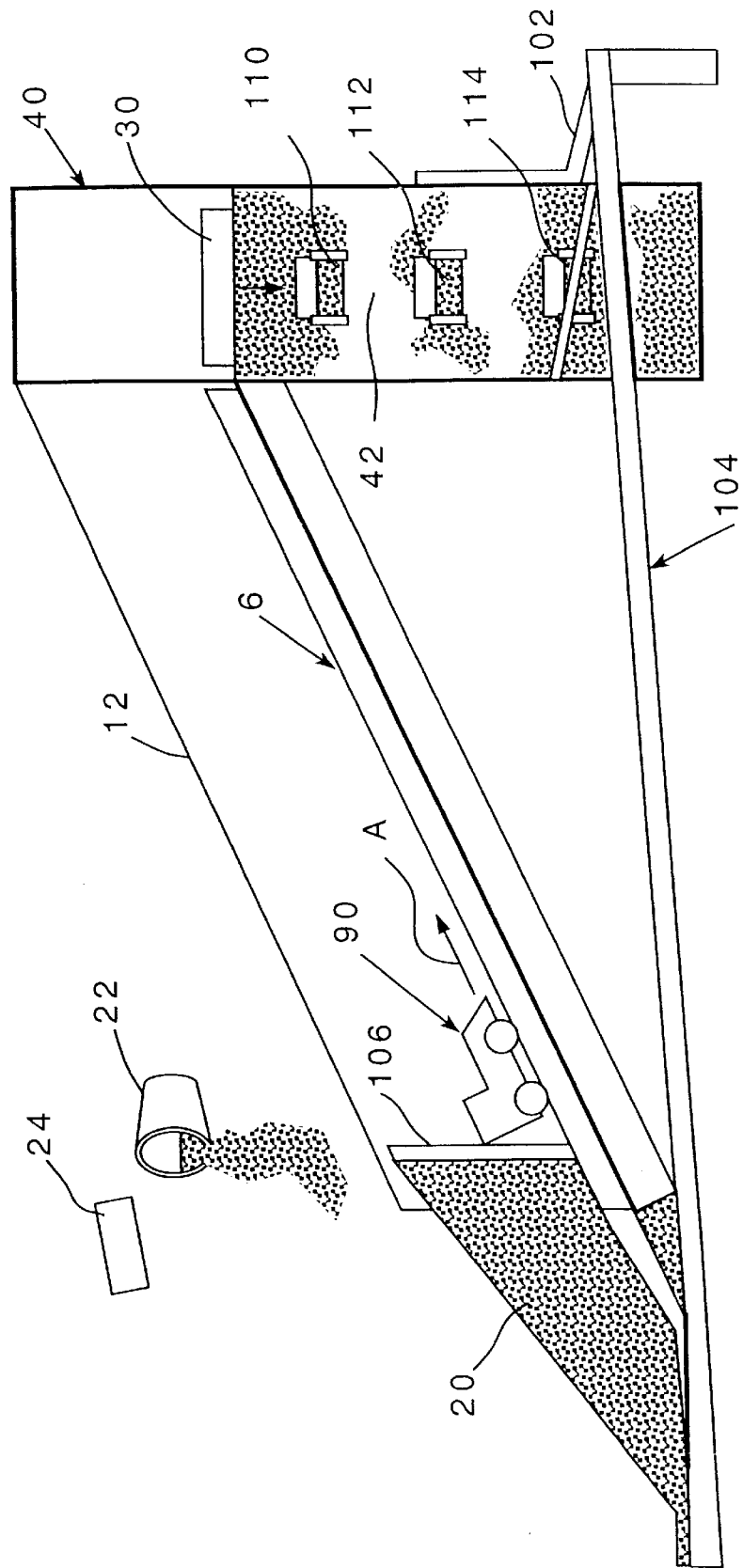
FIG. 5 is a schematic illustration similar to FIG. 1, but showing a modified form of apparatus and modified form of valve.

Referring to FIG. 5, it will be appreciated that, as the flowable particulate material is delivered to the rear portion of movable wall 106, with, the sidewalls 12 and 14 serving to restrain the material from moving off of the sides of the track 6. In this embodiment, the article being moved is a vehicle 90, which moves in the direction of arrow A. In this embodiment, the movable rear wall 106 has a height substantially greater than the height of the adjacent portion of article 90, as contrasted with the height of wall 8 (FIGS. 1 and 2), which is generally equal to that of article 2. This increased height increases the force available and may move a given article at a faster rate or up a steeper angle.

Figure 6B:
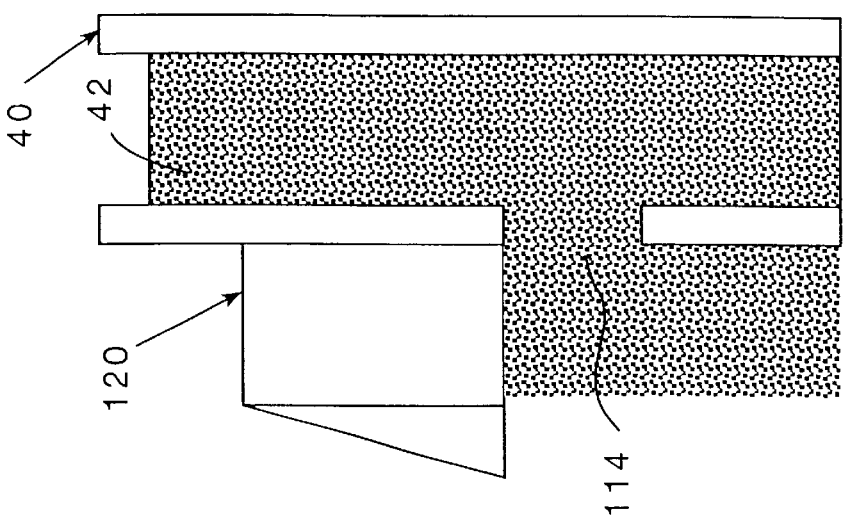
FIGS. 6(a) and 6(b) show, respectively, open and closed positions of a modified form of valve of FIG. 5.
Figure 6A:
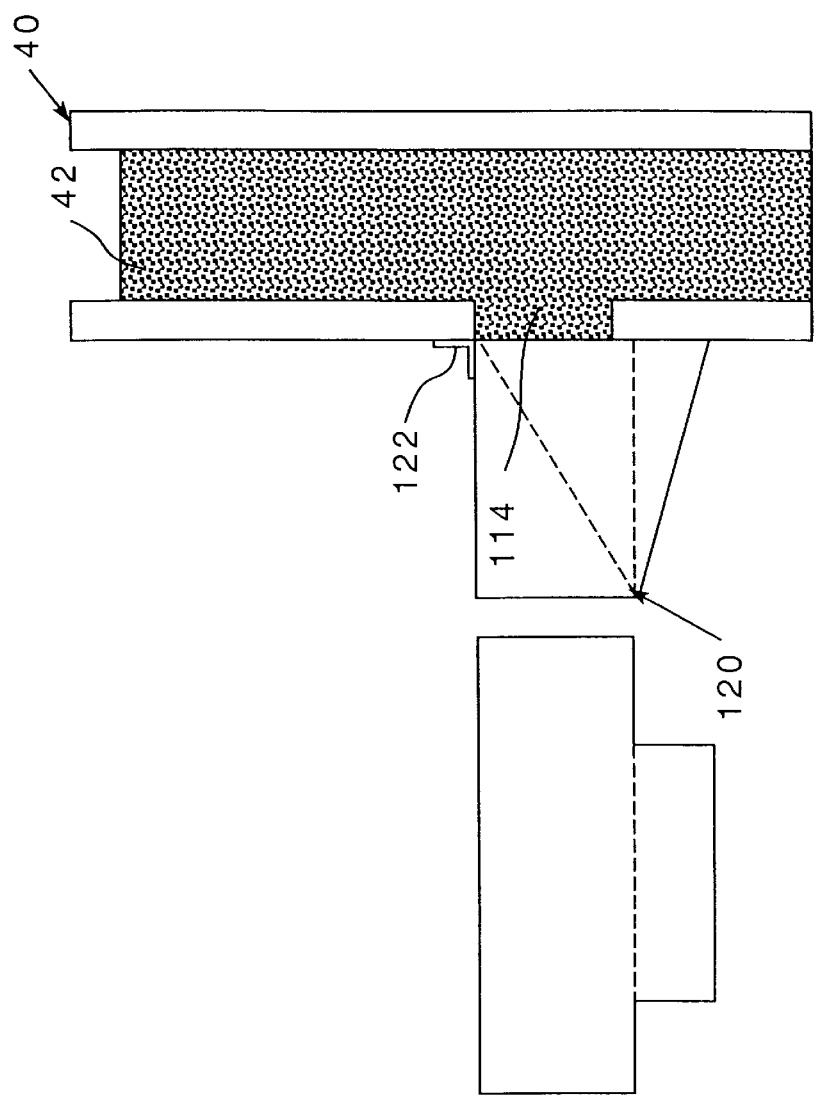

In this embodiment, a support 102 is structured to receive the article 90, once platform 30 has been lowered to an appropriate level, with a downhill track 104 facilitating return of the same to the initial position. Modified forms of valves 110, 112, 114 may be employed in this embodiment of the invention. As shown in FIGS. 6(a) and 6(b), the column 40, which may be generally cylindrical, has flowable particulate material 42 contained therein and a valve opening 114 of FIG. 6(a) showing rotatable valve element 120 in the closed position, which resists discharge of the flowable particulate material out of opening 114. Rotation of the valve element 120 in a clockwise direction about hinge 122, will position the valve element 120 in a valve open position, as shown in FIG. 6(b), thereby permitting discharge of the flowable particulate material 42. It will be appreciated that either wall 8, 106, and either type of valve 44, 46, 48 or 110, 112, 114, may be employed in various combinations as desired.

Figure 7:
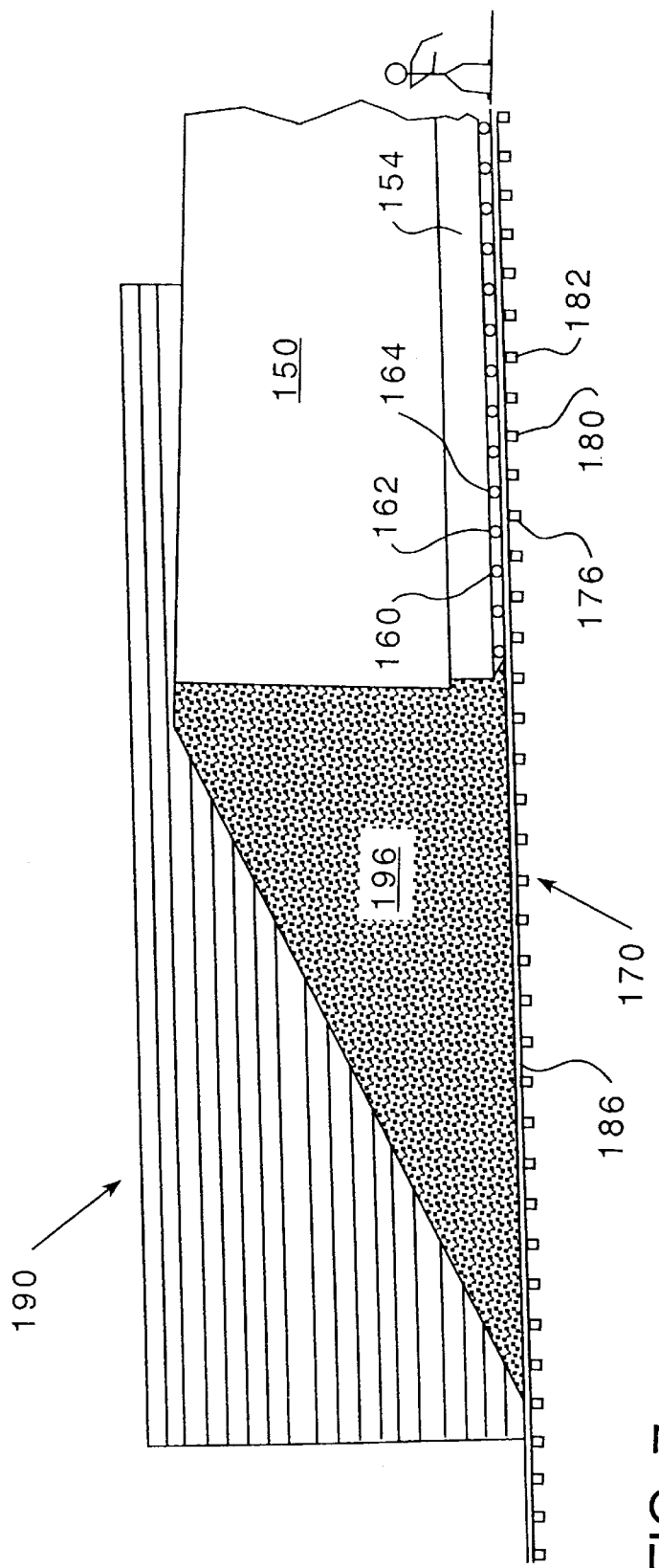
FIG. 7 is a schematic elevational view showing how the invention might have been applied centuries ago in moving an obelisk.

Referring to FIG. 7, an article 150, which may be a stone or obelisk, is supported on a sled 154 which rests on rollers such as 160, 162, 164, which are supported on track 170 having a plurality of cross timbers such as 176, 180, 182, which underlie the surface 186 and are joined to a pair of sidewalls 190 (and a parallel sidewall located near the rear portion of track 170) and cooperate to define a channel for passage of the article 150 and sand 196.

In the example of FIG. 7, if the stone or obelisk weighs 1000 tons, the force due to gravity causing this stone to slide down the 2% ramp is:

$F=(\sin(\arctan(S\%))*W)$ $F$=Force in pounds

Wherein $S\%$=The percent grade in number of feet rise per 100 feet of run

W=Weight of object in pounds

Considering an example: Using the "unfinished Aswan Obelisk" with:

$S\%$=2 percent

W=1,100 tons=2,200,000 pounds $F=\sin(\text{ArcTan}(\%\text{grade}=0.02))*2,200,000=45,258$ lbs.

The advantage of the engine in the present example is the fact that a single individual could move an 1100 ton stone up a 2% grade by utilizing its capabilities.

Once the horizontal obelisk is moved up the elevating ramp, the final engineering need is to rotate it precisely to a vertical orientation, so that it fits in a turning groove cut in the foundation stone on which the obelisk base finally rests.

Figure 8A:
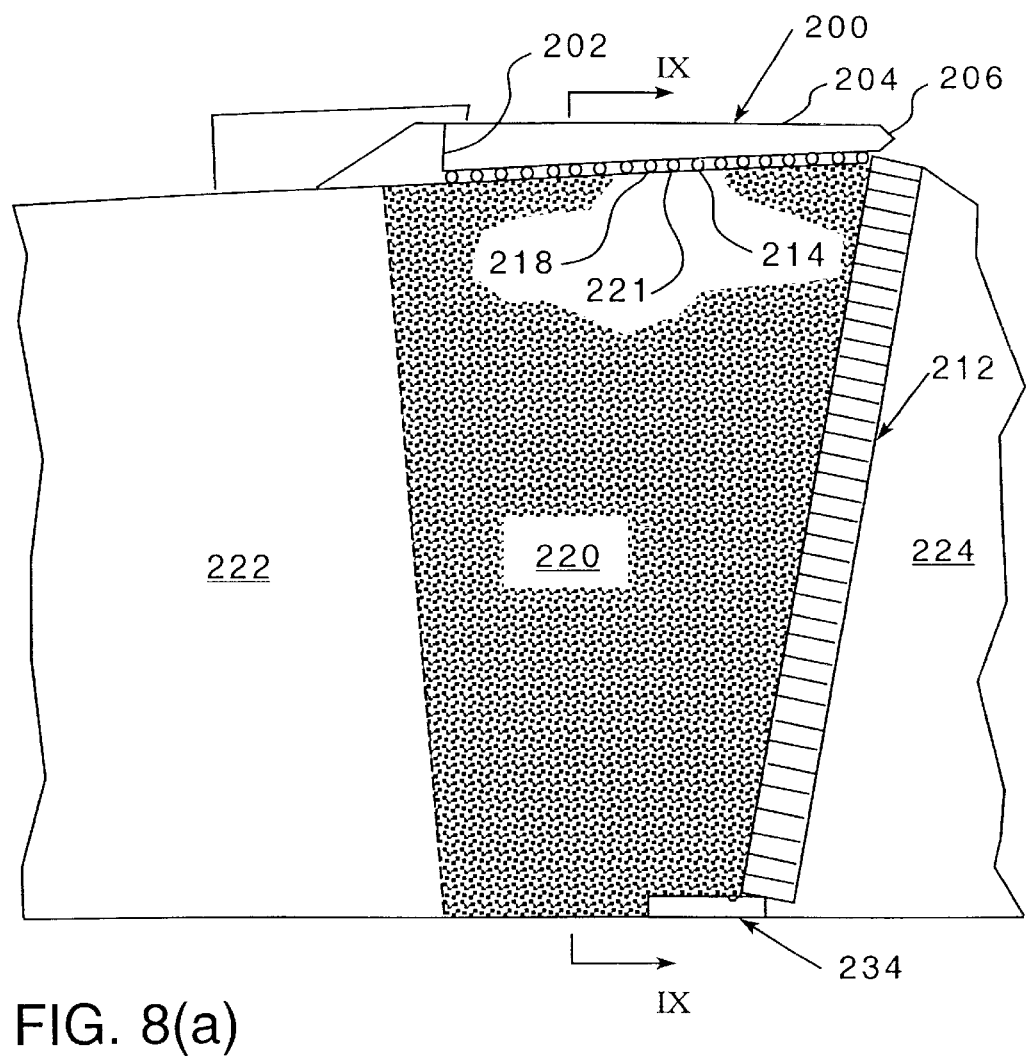
FIG. 8(a) is a schematic cross-sectional illustration showing the obelisk is an elevated horizontal position.
Figure 8B:
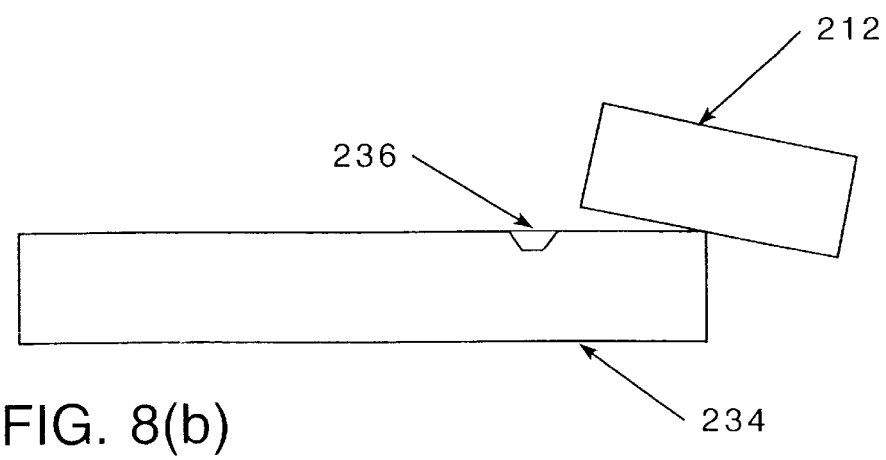
FIG. 8(b) is a detailed view of a portion of FIG. 8(a).

As shown in FIGS. 8(a), (b) and 9, an article 200, which, in the form shown, may be considered to be an obelisk having a generally square base 202, a transition portion 204, and a tapered end 206. The article 200 is shown in a generally horizontal orientation. A wall 212 is angularly positioned with respect to the article 200 with an underlying supporting sled 214 supported on rollers, such as 218, 221 and supported thereunder by flowable particulate material 220 which may have, on opposite sides thereof, a combination of sand and earth such as at 222 and 224. Walls 230, 232 confine the flowable particulate material therebetween. A base member 234 which will serve as a foundation stone for the article, which is shown in detail in FIG. 8(b), has a turning groove 236. On the exterior or walls 230, 232 are combinations of earth and sand 238, 240.

Figure 9:
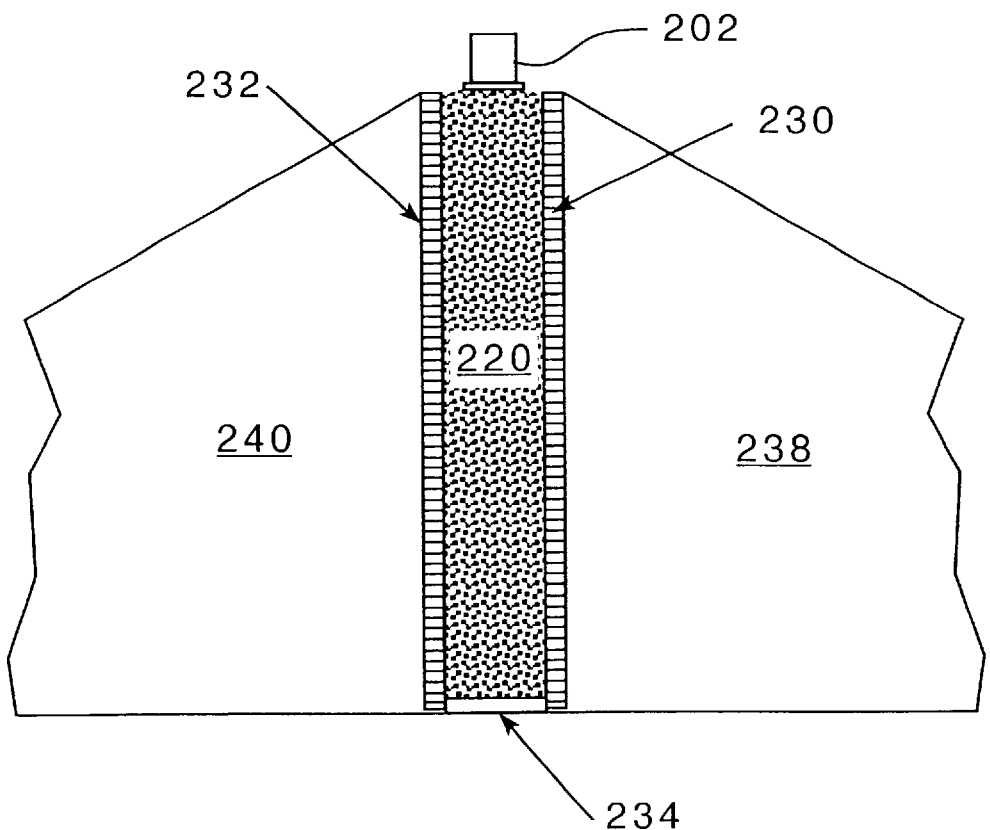
FIG. 9 is a cross-sectional illustration taken through IX—IX of FIG. 8.

It will be appreciated that the obelisk 200 in the position shown in FIGS. 8(a) and 9 has what may be considered gravitational potential energy with ultimate withdrawal of the underlying sand 220 in a predetermined manner facilitating location and lowering of the obelisk 200 to the desired position supported on the obelisk foundation stone 234.

Figure 10:
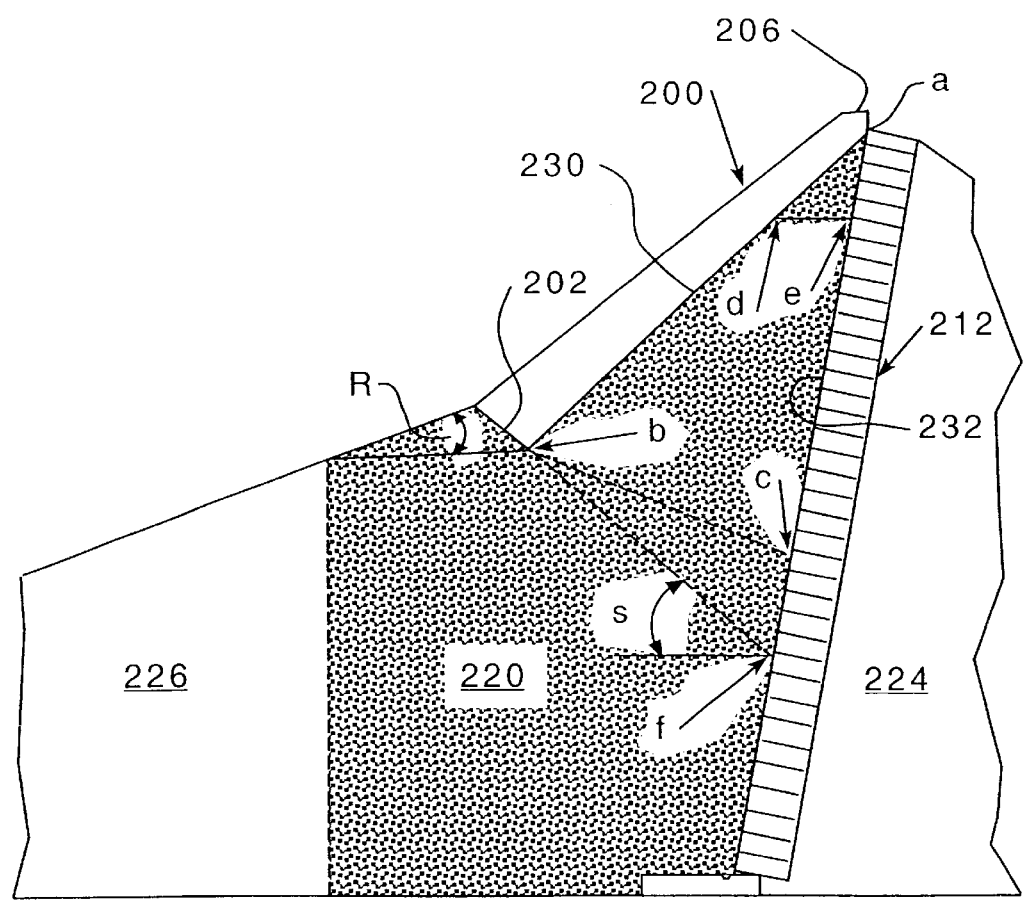
FIG. 10 is a schematic elevational view showing the obelisk partially rotated.

FIG. 10 shows the article 200, which, in the form shown, is an obelisk having a base 202 and a tapered other end 206. In the view shown, it may be considered to be in a position moving partially upward with the angle of repose of the sand 220 being angle "R" which is shown as 30 degrees, and the internal shear angle "S" shown as 45 degrees. It will be appreciated that in elevating the article 200 to the position shown in FIGS. 8(a) and 9 continued application of sand to the region 220 will apply an appropriate force to the obelisk 200 to lift the same. In reversing this process, sand 220 underlying the obelisk 200 from a starting position such as shown in FIGS. 8(a) and 9 results in the obelisk moving downward until it assumes a generally vertical position with external wall 230 of obelisk 200 generally facing internal surface 232 of wall 212, with the base 202 having a portion entering the tilting or turning groove 236 (FIGS. 8(a)).

Once the article such as an obelisk is "pushed" to the top of the ramp, one may make use of the gravitational potential energy of the raised horizontal obelisk, and of the piled sand beneath it, to cause the desired rotation, gently and controllably. This is accomplished by removing sand beneath the obelisk under controlled conditions. That is probably most easily done by using side containing walls in which open horizontal holes or "chutes" (not shown) of specific dimensions are placed at desired locations. These "horizontal chutes" become "sand valves." The "sand valves" lower and rotate the obelisk to its final vertical position.

FIGS. 3 and 4 show a general example of a vertical stone wall with a rectangular hole forming a horizontal chute or "sand valve". As long as the horizontal section of the chute is more than two (or, for this example 1/tan(39 degrees)) times the vertical height of the opening, no sand will escape. Dry sand only flows until the angle of repose is established in the chute. A worker with a hoe on the outside of the wall removes sand from the "outside" of the chute at a controlled rate. In turn sand from the "inside" of the wall flows in the chute until the angle of repose is re-established. In this process the article is gently lowered.

A "straight" but slanted shape is not a necessary configuration for this guide wall 212 (FIG. 10). Also the "top" of the horizontal obelisk could be to the right of the intersection with the guide wall 212. The wall 212 (and associated ramp) as shown in FIGS. 8(a)–10 makes it desirable that the ramp be considerably higher than other possible guide wall shapes. It also means that the internal "shear" angles of sand are utilized to produce the necessary horizontal motion of the obelisk's center of gravity in order to get the base properly in the "turning groove." Finally the rotation with such a wall is centered about the upper end of the obelisk. This does minimize undesirable mechanical tension in the obelisk shaft that might lead to cracking. Such a consideration would have been extremely important for the 1168 ton unfinished Aswan obelisk, for example. The geometry shown is an example that demonstrates the complete control a small work force would have to precisely rotate and locate the obelisk in a vertical position.

For a ramp of minimum height, the obelisk's center of gravity (while still horizontal) should be placed just to the right of a vertical from the turning groove. Moving the obelisk's center of gravity horizontally during rotation is then minimized. Horizontal motion simply requires using more of the gravitational energy stored in the sand beneath the obelisk. If this revised position is used, the ramp need be only slightly higher than the vertical distance of the obelisk's center of gravity above its "bottom," divided by the cosine of the internal angle of shears for "hydraulic" sand. For purposes of illustration herein, this internal angle of shear is assumed to be 45 degrees. Rotation at this minimum ramp height, however, would maximize breaking stresses on the obelisk shaft (one half of its mass is completely unsupported).

FIG. 9 shows how side "control" walls could be placed properly in the ramp during the ramp's construction. These walls 230, 232 are constructed with a "lattice" of open horizontal chutes or "sand valves" at appropriate positions. These sidewalls 230, 232 do not need to be particularly robust as they (and the ramp to the left of the obelisk as shown in FIG. 10) would be progressively removed during the obelisk's descent and rotation. They could be made of any quarried stones placed in overlapping horizontal layers with an appropriate lattice of gaps at selected locations. While the stones have to be twice as wide as they are high, the horizontal length of the stones could be arbitrary as available. Sand therefore could be removed in a controlled fashion by a continued "hoeing" of selected chutes by the same relatively small, trained work force.

Although it has been suggested that simple removal of sand beneath the obelisk could be used to "tilt" it to its final position, further controls would be preferred to accomplish this rotation with precision that ensured the integrity of this brittle granite article. It is preferred that the material directly beneath the obelisk consist of just fine "hydraulic sand", free of rocks and other extraneous matter. This area of selected sand 220 is indicated in FIGS. 8(a)–10. The flow properties of sand would influence its controlled removal in various stages to effect a complete rotation of the obelisk to a near vertical orientation using gravitational forces alone.

As an example, the elevated horizontal obelisk is positioned with its top just above the upper edge of the slanted "crib" (wall 212 of FIG. 8(a)). With an initial assumption that the working internal "shear" angles of the sand is 45 degrees (which preferably should be greater than the angle of repose of about 30 degrees), the 137 foot unfinished Aswan obelisk should be raised to an elevation of approximately 194 feet (137 feet divided by the cosine of 45 degrees).

Actual rotation and lowering the obelisk 200 could proceed in several stages. At the start, the angle between the base 202 of the obelisk and the horizontal would be almost exactly ninety degrees. Initially sand could be removed from directly beneath the obelisk 200 so that the obelisk would rotate about its "top". This would continue to an intermediate position with the angle between the obelisk's bottom and the horizontal steadily diminishing as rotation occurred. At some point rotation would stop. At this point the compacting of the sand due to the gravitational component of the obelisk's weight perpendicular to its "bottom" would bring the system into a steady state. This angle generally would be greater than the "uncompacted" angle of repose. If sand were then removed from the zone defined by the "inner" vertical surface 230 of the obelisk 200, a line traversing the base of the obelisk and the "tilted"crib" (wall 212) behind" the obelisk, the obelisk would remain stationary, and removal would cause this sand to be cleared from this triangular zone. This zone is indicated by the triangle defined by the letters "a," "b" and "c" in FIG. 10.

Removing sand from the zone defined by the triangle "abc" would be a definite asset of this approach. The sled used to support the obelisk during transport could now be removed with care and precision. A further benefit is also clear. Three sides of the obelisk could have been carved and polished while it was horizontal and in transit to the final site. The fourth or "bottom" side would have been inaccessible. However, while in this intermediate stable position stone masons could finish the fourth side while standing on the top surface of the sand during its controlled removal. This surface is indicated by the line "d–e" of FIG. 10.

With sand removed completely from the triangle "abc", the obelisk still remains stable. Assuming the effective internal shear (or slippage) angle for the sand is about 45 degrees, sand removed from the triangular area "bcf" would cause the obelisk base to "slip" toward the slanted retaining wall 212. In this stage, sand is slipping beneath the obelisk base 202, and the center of gravity of the sand beneath the obelisk is sliding to the right (in FIG. 8). Assuming an initial location of the obelisk with respect to wall 212, this horizontal motion of the obelisk's center of gravity is essential to bring one side of the obelisk into contact with the guide wall 212. As this procedure continued, the top sand slope would always remain at about thirty degrees to the horizontal. When the obelisk reached wall 212, sand would then be removed from beneath it until the obelisk descended into the turning groove 236 (FIG. 8(b)). At that point, remaining sand could be cleared from the base and the obelisk wedged or pulled into its final vertical position by the same relatively small work force.

The "semi-hydraulic" properties of dry uncompacted flowable granular material that make it suitable for the "sand engine" are tied to this easily observable and easily measured angle of repose. The smaller the angle of repose, the greater the active horizontal force exerted by a pile of that type of sand against a vertical wall or the vertical base of a horizontal obelisk. Sand with "jagged" particles tends to remain at a steep angle. Sand worn to "rounded" particles by constant movement and grinding becomes more like a pile of marbles or ball bearings. These flow outward and transmit a larger active horizontal force when constrained by a vertical surface. The horizontal force of sand piled against a vertical surface is the weight of the sand which is trying to slide downward until the natural angle of repose is established. The applicable general formula, first quantified by Rankine in 1857, is $sigma_h/sigma_v = \tan(45-Ø/2)$. $Sigma_h$ is the coefficient of active horizontal pressure in pounds per square foot. $Sigma_h$ is the coefficient of vertical pressure in pounds per square foot (due to the weight of sand per cubic foot). Ø equals the drained friction angle (or angle of repose) for that sand. "Advanced Soil Mechanics," Second Edition, Braja M. Das, California State University, Sacramento.

For a comparison of the forces available from a pile of dry uncompacted sand, consider a concrete wall or dam across a stream of water that is filled to the top of the dam.

In terms of Rankine's formula water is a "loose aggregate" with a drained friction angle of zero degrees. That is, an initial "pile" of water will flow outward until it is flat and Ø=zero. Tan (45-Ø/2) becomes Tan (45) and $sigma_h = sigma_v$. The active horizontal pressure of the water equals the vertical water pressure. As fresh water weighs about 62 pounds per cubic foot, the horizontal pressure on the dam wall increases by 62 pounds per square foot for each one foot depth of the water contained by the dam. The total horizontal force on the dam wall can be calculated by integrating this horizontal pressure over the complete area of the dam wall.

Assume that the dam is filled instead with a level body of sand with an angle of repose (drained friction angle) equal to 30 degrees. Rankine's standard formula $\tan^2(45-Ø/2)$ becomes $\tan^2(30)$ which has a value of precisely ⅓. The active horizontal pressure of this sand is ⅓ the vertical pressure. As with water, this horizontal force increases linearly with the depth of the sand behind the dam wall. Dry, uncompacted sand weighs approximately 100 lbs. per cubic foot. Thus, at one foot of depth the active horizontal pressure of the sand will equal about 33 pounds per square foot, i.e. ⅓rd the vertical pressure at a depth of one foot, using the above estimate for density of sand. For two feet of depth, the horizontal pressure becomes about 67 pounds and so on. The active horizontal force of this sand against the dam wall is somewhat more than ½ the force which would occur if the dam were filled with water. Such large horizontal forces would have been very significant for the movement of very large articles such as obelisks of ancient Egypt which could weigh well in excess of 200 tons.

Flowable granular material, for example, has an advantage over water as a hydraulic fluid. It doesn't need to be contained on its back side. It can just be piled against a wall or the vertical base of an article that needs to be moved. It, therefore, can function effectively in the present invention when only partially constrained.

To demonstrate the useful magnitude of this force for moving large articles, assume that sand with a 28 degree angle of repose is piled against the nearly vertical base of the horizontally oriented unfinished Aswan obelisk. Table 1 gives the dimensions of this base as 13.8 feet square. Assume that the flowable granular material is piled to the "top" of this base. The total horizontal force becomes approximately 47,431 pounds. The horizontal force coefficient becomes $sigma_h = sigma_v \times (\tan^2(45-Ø/2))$ where Ø=28 degrees. This result is approximately 0.36 times the vertical pressure of the sand column at a depth "x" feet from the top. The differential force at a depth of "x" feet equals the sand density (100 lbs./cubic foot), times the width of the obelisk base (13.8 feet), times the horizontal force coefficient. This becomes approximately 100 lbs./cubic foot×13.8 feet×0.36. Integrating this differential horizontal force from a depth of zero at the "top" of the horizontal obelisk base to the "bottom" of the base (13.8 feet below) gives the total horizontal force against the obelisk base. The resultant integration gives (100 lbs. per $ft^3$.)×(13.8 ft. width)×0.36× (the 13.8 foot depth of the sand pile in feet)²×½=47,431 lbs. This is within 625 pounds of the force needed to overcome the downward force of gravity on a 2% grade, which is approximately 48,056 pounds. The human work force now only needs to overcome slightly more then the forces of friction in the obelisk support system to move this immense obelisk up such a grade. Such a ramp grade would be constructed to properly elevate the horizontal obelisk before final rotation to an erect position. To put a 2% grade in perspective, it is near the maximum grade for a modern railroad. For the mechanical purpose of this analysis, each obelisk can be described by three independent variables: its weight, the dimension of its square base, and the taper of its sides.

Table I is a single calculation table in the test prepared for one type of sand (with an angle of repose of 28 degrees). Each line of the table contains the following data: (1) Each obelisk is considered to be pushed up a ramp with a slope equal to the taper of it's shape (½ the total taper of Column 4). With this ramp slope, the base of that horizontal obelisk is a vertical surface. (2) The gravitational force attempting to slide each obelisk down it's associated ramp is calculated for each obelisk; Column 6. This is directly related to the obelisk's weight and the ramp slope. (3) Sand is assumed to be piled to the top of each obelisk's vertical base. (4) The horizontal force of the pile of sand against the vertical base of each obelisk is calculated for the single common sand angle of repose using the Rankine formula. This force of the sand attempts to push the obelisk up its particular ramp against the force of gravity. Column 7 shows this force for each obelisk. This force is directly related to the density of dry uncompacted sand (uniformly assumed to equal 100 lbs. per cu. ft.) and to the dimensions of each obelisk's base. (5) The difference force between the "upward push" of the sand piled against the obelisk base and the downward force of gravity is listed in column 8. This difference is positive if the "push" of the sand is greater than the force of gravity and negative if it is less. (6) These differences are squared. At the bottom left of Table I is the square root of the mean square of the sum of these values for the ten obelisks using the single angle of repose (sand type) of this particular Table.

TABLE 1

Sand Angle of Repose = 28 Degrees

| 1 Obelisk | 2 Base Dim (feet) | 3 Height (feet) | 4 Total Taper | 5 Weight (tons) | 6 Req Force Taper lbs | 7 Sand Force lbs. | 8 Difference Force lbs. |
|---|---|---|---|---|---|---|---|
| Aswan | 13.8 | 137.0 | 24.3 | 1168 | 48056 | 47431 | −625 |
| Lateran* | 9.8 | 105.6 | 29.3 | 455 | 15527 | 16988 | 1461 |
| Hatshepsowet | 7.9 | 97.0 | 42.8 | 323 | 7546 | 8900 | 1353 |
| Vatican | 8.8 | 83.0 | 26.9 | 331 | 12303 | 12300 | −3 |
| Luxor* | 8.2 | 28.2 | 28.2 | 254 | 9006 | 9952 | 946 |
| Paris | 8.0 | 74.0 | 26.5 | 227 | 8565 | 9241 | 676 |
| New York* | 7.7 | 69.6 | 29.0 | 193 | 6654 | 8240 | 1586 |

TABLE 1-continued

Sand Angle of Repose = 28 Degrees

| 1 Obelisk | 2 Base Dim (feet) | 3 Height (feet) | 4 Total Taper | 5 Weight (tons) | 6 Req Force Taper lbs | 7 Sand Force lbs. | 8 Difference Force lbs. |
|---|---|---|---|---|---|---|---|
| London* | 7.8 | 68.5 | 27.4 | 187 | 6824 | 8565 | 1741 |
| Mataria* | 6.2 | 67.0 | 27.5 | 121 | 4399 | 4302 | −98 |
| Tuthmosis | 7.0 | 64.0 | 24.2 | 143 | 5908 | 6190 | 283 |

RMS Deviation Including "unfinished" 1065 lbs.

Figure 11:
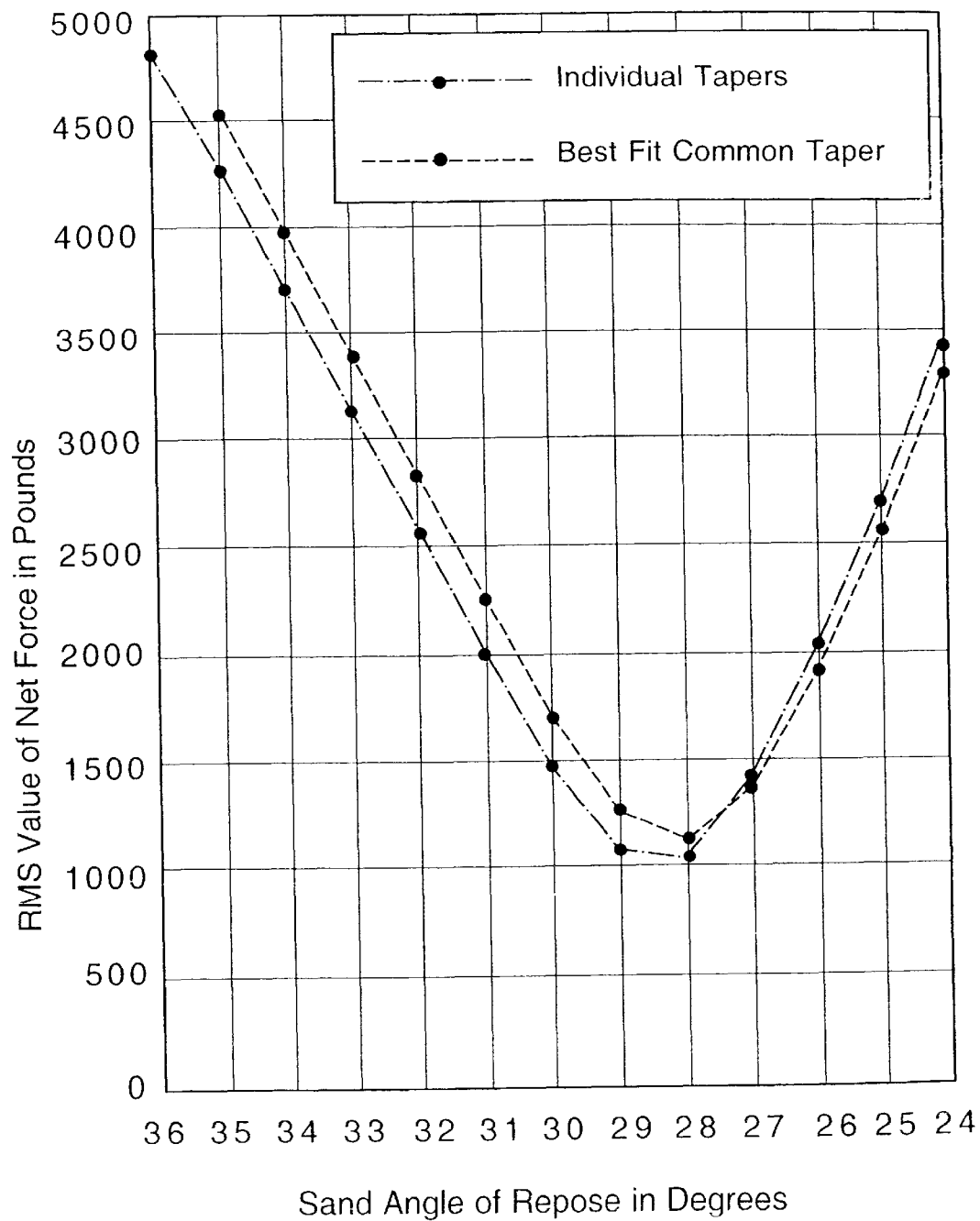
FIG. 11 shows a plot of the RMS value of net force difference versus sand angle of repose for certain objects.

FIG. 11 shows the major result, including the "unfinished" obelisk" at Aswan. The lower curve is the result for ramp slopes constructed equal to the taper built into each obelisk. The upper curve is the result for the best fit common ramp slope of 2%. The minimum is very definite in both cases for sand with an angle of repose of 28 degrees. A slightly smaller minimum value is obtained by assuming that each ramp slope was constructed so that the bases of each horizontal obelisk were "exact" vertical surfaces. The net added force required for the 1168 ton "unfinished" Aswan obelisk is reduced to 625 pounds. Using sand, a reasonably small group of workers with ropes "graspable" by human hands could provide the added force and guidance needed to move this immense stone up its ramp until it attained an elevation where it could be rotated to a vertical position. The RMS deviation for all ten obelisks is only 1065 pounds.

Figure 12:
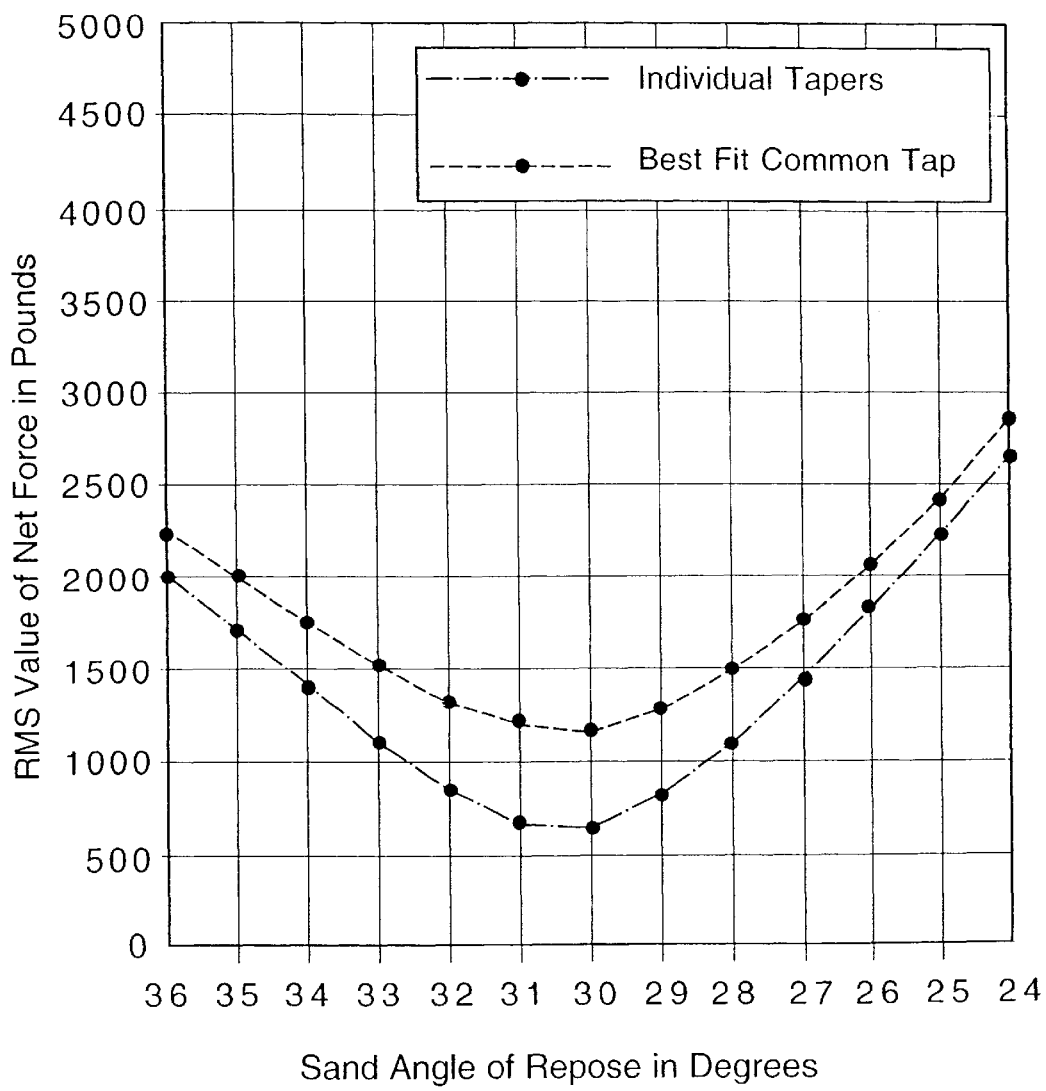
FIG. 12 shows plots of the RMS value of net force difference versus sand angle of repose for a different set of objects.

Table I shows the same calculations repeated for just the finished obelisks. FIG. 12 graphs this result. The RMS variation is now reduced to 642 pounds and the table of difference forces is nearly symmetric. The average of the mean force differences is only 160 pounds. Here again the best fit "common" slope does not produce as definite a force minimum as the assumption that each ramp was constructed so that the base of it's obelisk was "exactly" vertical when it was located on that slope.

Figure 13:
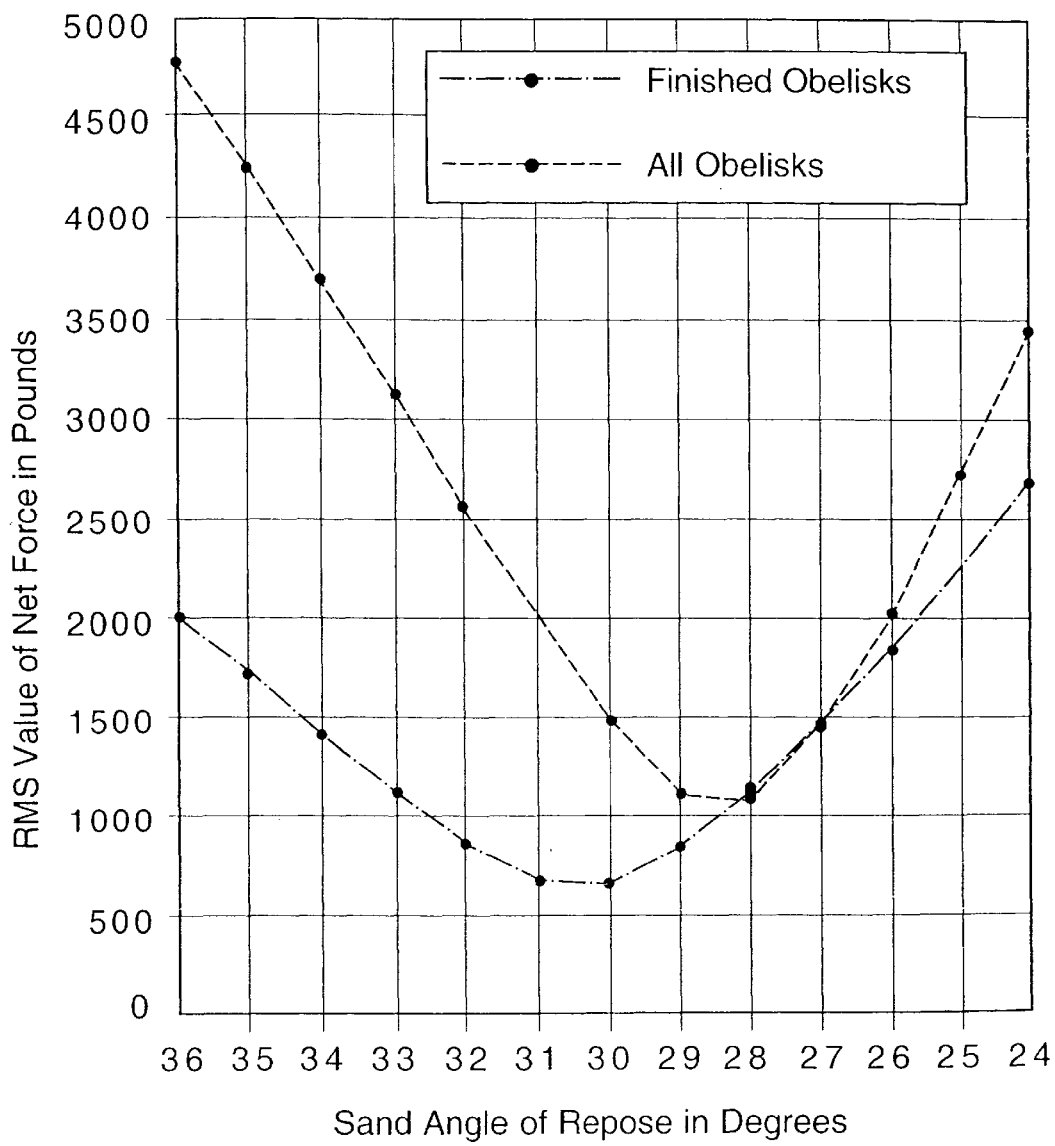
FIG. 13 is a plot of RMS value of net force difference versus sand angle of repose which effects a comparison of FIGS. 11 and 12.

FIG. 13 compares the two results shown in FIGS. 11 and 12. The unfinished Aswan obelisk of FIG. 13 is 2.6 times heavier than the other large obelisks. It clearly shifts the optimum angle of repose from 30 degrees to 28 degrees, as well as forcing an asymmetry in the force variations about zero pounds. In all cases "men pulling on ropes" are now needed only to guide each obelisk on its ramp and to overcome friction in the suspension system beneath the obelisk.

In order to compare the use of the effects of two different angles, two tests were performed. The tests employed play sand obtained at a hardware store.

Measuring friction is accomplished by measuring the height of the "hydro-aggregate" needed to move the article when the track slope is zero.

The results are shown in Table 2, with Sand Engine 1 employing a 3 degree angle and Sand Engine 2 employing an angle of 25 degrees.

EXAMPLE 1

To measure friction: measure height of "hydro-aggregate" needed to move engine track slope is zero=Friction Force.

TABLE 2

| Friction Force | | Steepest Toy Angle | | True |
|---|---|---|---|---|
| Sand Engine 1 | | | | |
| Force Up Slope (oz.) = | 0.1307 | Force Up Slope (oz.) = | | 0.1879 |
| Force Down Sloe (oz.) = | 0.0000 | Force Down Slope (oz.) = | | 0.0524 |
| Difference Force (oz.) = | 0.1307 | Difference Force (oz.) = | | 0.1355 |
| Weight (oz.) = | 1.00 | Weight (oz.) = | | 1.00 |
| Density sand (oz./cu.in.) = | 1.01 | Density sand (oz./cu.in.) = | | 1.01 |
| Sand AR (degrees) = | 50.00 | Sand AR (degrees) = | | 50.00 |
| Slope ∅ (degrees) = | 0.00 | Slope ∅ (degrees) = | | 3.00 |
| Width (inches) = | 1.25 | Width (inches) = | | 1.25 |
| Height (inches) for movement | 1.25 | Height (inches) = | | 1.50 |
| Sand Engine 2 | | | | |
| Force Up Slope (oz.) = | 0.1307 | Force Up Slope (oz.) = | | 1.2126 |
| Force Down Sloe (oz.) = | 0.0000 | Force Down Slope (oz.) = | | 0.4663 |
| Difference Force (oz.) = | 0.1307 | Difference Force (oz.) = | | 0.7463 |
| Weight (oz.) = | 1.00 | Weight (oz.) = | | 1.00 |
| Density sand (oz./cu.in.) = | 1.01 | Density sand (oz./cu.in.) = | | 1.01 |
| Sand AR (degrees) = | 50.00 | Sand AR (degrees) = | | 50.00 |
| Slope ∅ (degrees) = | 0.00 | Slope ∅ (degrees) = | | 25.00 |
| Width (inches) = | 1.25 | Width (inches) = | | 1.25 |
| Height (inches) for movement | 1.25 | Height (inches) | | 4.00 |

At a given track slope, the calculated difference force must be greater than the friction force for the engine to move.

While the disclosure has emphasized initiating movement of an article, it will be appreciated that the force inherent in the preceding disclosure of the movement properties of uncompacted aggregates such as a flowable granular material which may be sand can also be used to stop movement.

This control would be very precise in lowering articles using sand, and depends on the (horizontal measurement of the) walls constraining the sand (at the location of the opening) could be twice as thick as the height of the horizontal "valve" opening (in the wall). One person could "hoe" out the sand in small increments (in comparison to the size of the sand "column" being lowered), thereby carefully lowering a heavy article that is being supported by the sand column.

In portions of the disclosure, discussion of the invention in the context of speculating as to how ancient Egyptians may have moved a large object such as an obelisk was considered, but in the absence of specific reference to a prior art disclosure, such analysis should not be deemed to be a positive statement that such procedures and structures were, in fact, known in the prior art.

Various means of establishing the desired orientation of rear movable walls 8, 106 while permitting movement thereof along a track, will be known to those skilled in the art. For example, transversely projecting arms extending from such walls may be received in elongated slots in the sidewalls and one or more downwardly projecting arms may be received in elongated slots in the track.

It will be appreciated that, while for convenience of disclosure herein, specific reference has been made to moving articles which are vehicles or obelisks, the invention is not so limited and a wide variety of articles may be moved using the methods and apparatus of the present invention. By computing the forces needed and the specific choice and quantity of the flowable particulate material and angle of repose, one skilled in the art can readily adapt the method and apparatus of the present invention to the specific needs of a particular end-use environment. As will be apparent to those skilled in the art, in addition to the example of use given herein, numerous other applications are contemplated, and others will be apparent to those skilled in the art. For example, the method and apparatus readily lends itself to use in an educational device, which might be employed in schools, in museums and in other environments. Further, use in commercial and industrial environments is contemplated.

While, for purposes of illustration, systems involving both moving the article to a higher level and, in one or two stages, lowering the article to a lower level has been provided, it will be appreciated that the concepts of the present invention may be employed (a) to move an article over a substantially level path or (b) to employ concepts of elevating an article or lowering an article as presented in the invention, without combining both raising and lowering of an article, if desired. All that would be required for an approach would be to eliminate those portions of the method and apparatus not required for the particular use.

Whereas particular embodiments have been described herein, for purposes of illustration, it will be evident to those skilled in the art that numerous variations of the details may be made without departing from the invention, as defined in the appended claims.

What is claimed is:

1. A method of moving an article along a track comprising providing a track with a pair of sidewalls disposed on opposite sides thereof and a rear wall movable therealong under the influence of a flowable granular material, positioning said article on said track in front of said movable wall, and introducing flowable granular material behind said rear wall to establish a force that urges said rear wall and said article along said track responsive to forces applied by said flowable granular material.

2. The method of claim 1 including securing said rear wall for relative sliding movement with respect to at least one of said track and said sidewalls.

3. The method of claim 2 including positioning said track with a slope upwardly from back to front.

4. The method of claim 2 including providing a vertically movable platform positioned adjacent to the front end of said track, delivering said article to said platform, providing a column of flowable granular material underlying said platform, and progressively withdrawing said column of flowable granular material to lower said platform and said article.

5. The method of claim 4 including employing a plurality of valve openings in said column through which said flowable granular material is removed.

6. The method of claim 5 including providing a second track adjacent to said column, delivering said article to said second track, and employing as said second track a downhill track which slopes away from said column to move said article therealong under the influence of gravity.

7. The method of claim 2 including employing sand as said flowable granular material.

8. The method of claim 7 including manually introducing said sand behind said movable wall.

9. The method of claim 7 including introducing said sand behind said movable wall by a conveyor.

10. The method of claim 1 including employing a vehicle as said article.

11. The method of claim 10 including employing a toy vehicle as said article.

12. The method of claim 1 including employing said method in an educational display.

13. The method of claim 1 including employing said method in an industrial process.

14. The method of claim 1 including employing a said movable rear wall which is generally of the same height as the adjacent portion of said article.

15. The method of claim 1 including employing a said movable rear wall which is generally taller than the adjacent portion of said article.

16. The method of claim 4 including employing valve openings in said column to withdraw said flowable granular material.

17. The method of claim 16 including employing valves having movable valve elements which in one position, close the valve and in another permits discharge of flowable granular material therefrom.

18. The method of claim 1 including employing a first said track having a rear to front upward slope of about 2 to 10 degrees.

19. The method of claim 1 including determining the amount of flowable granular material to provide behind said rear movable wall with reference to the materials angle of repose of said flowable granular material under the influence of gravity.

20. The method of claim 4 including determining the rate of withdrawal of flowable granular material from said column based upon the angle of repose of said flowable granular material under the influence of gravity.

21. The method of claim 1 including establishing said force in a direction different from the direction of the initial force field operating on said flowable granular material.

22. The method of claim 19 including employing an angle of repose that is about 20 to 46 degrees.

23. Apparatus for moving an article comprising an elongated track for supporting said article during movement therealong, relatively spaced sidewalls positioned on opposite sides of said track, and a rear wall movably secured for movement with respect to at least one of said track and said sidewalls under the influence of a flowable granular material provided against the rear surface of said movable rear wall, whereby depositing of a flowable granular material progressively behind said rear wall will apply a force thereto, thereby urging said rear wall forwardly along said track and creating responsive movement of said article along said track.

24. The apparatus of claim 23 including positioning said track with a slope upwardly from back to front.

25. The method of claim 24 including establishing said slope at about 2 to 10 degrees.

26. The method of claim 25 including a vertically movable platform positioned adjacent to the front end of said track, and a column for providing flowable granular material underlying and supporting said platform, whereby progressive removal of said flowable granular material will result in said platform and any article positioned thereon moving downwardly.

27. The method of claim 26 including employing a plurality of valve openings in said column through which said flowable granular material may be removed.

28. The method of claim 27 including providing a second track adjacent to said column for receiving said article, and employing a downhill track as a second track having a slope away from said column to move said article therealong under the influence of gravity.

29. The apparatus of claim 23 including said apparatus being structured to employ a material selected from the group consisting of sand, particulate rock, particulate synthetic material and combinations thereof as said flowable granular material.

30. The apparatus of claim 23 including a conveyor for delivering said flowable granular material to a position rearwardly adjacent to said rear wall.

31. The apparatus of claim 23 including employing a vehicle as said article.

32. The method of claim 31 including employing a child's toy vehicle as said vehicle.

33. The apparatus of claim 23 including said apparatus being an educational demonstration device.

34. The apparatus of claim 23 including said movable rear wall being generally of the same height as the adjacent portion of said article.

35. The apparatus of claim 23 including said movable rear wall having a height greater than the adjacent portion of said article.

36. The method of claim 27 including said valve having valve elements associated with said valve openings movable between a closed position, which resists discharge of said flowable granular material and an open position which permits discharge of said flowable granular material.

37. The apparatus of claim 27 including said track having roller means facilitating movement of said article therealong.

38. The apparatus of claim 37 wherein said article is without wheels.

\* \* \* \* \*

UNITED STATES PATENT AND TRADEMARK OFFICE
CERTIFICATE OF CORRECTION

PATENT NO. : 6,739,827 B1
DATED : May 25, 2004
INVENTOR(S) : William J. Spry

It is certified that error appears in the above-identified patent and that said Letters Patent is hereby corrected as shown below:

Column 5,
Line 24, after "material" insert -- 20 --.

Signed and Sealed this

Twenty-fifth Day of January, 2005

JON W. DUDAS
*Director of the United States Patent and Trademark Office*